L. H. BERRY.
TIRE SIGNAL.
APPLICATION FILED AUG. 7, 1917.
1,281,274.
Patented Oct. 15, 1918.
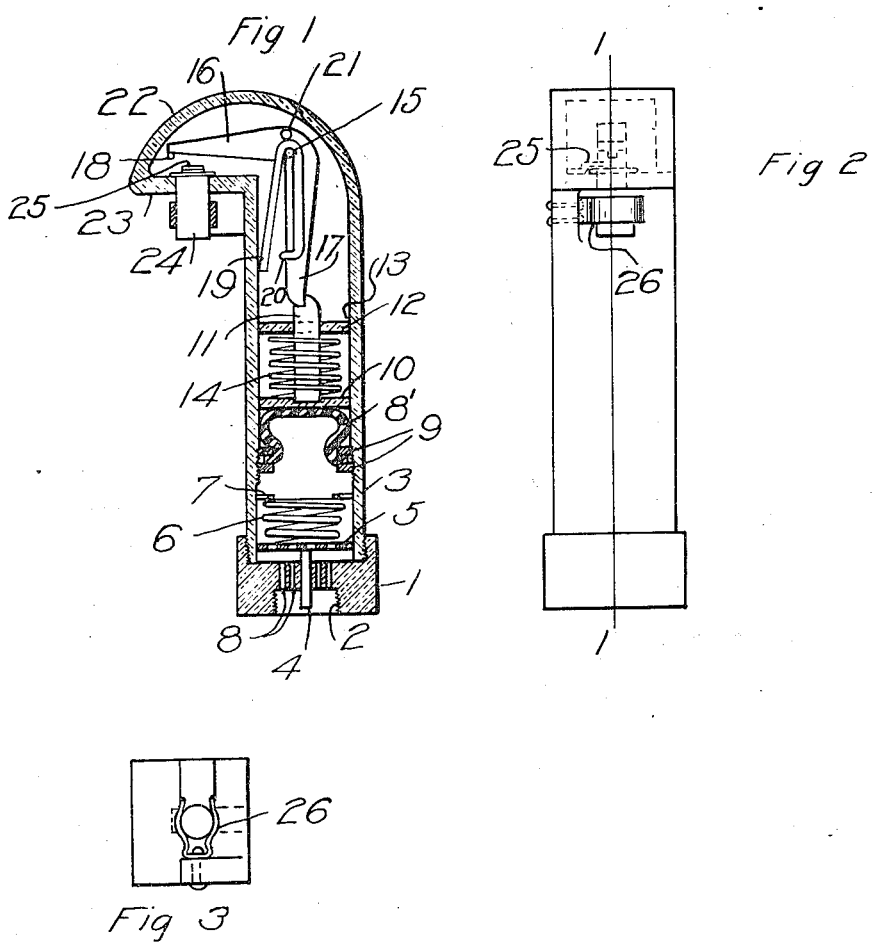
Inventor:
Louis H Berry
by C.D.Enochs
Attorney

UNITED STATES PATENT OFFICE.

LOUIS H. BERRY, OF MINNEAPOLIS, MINNESOTA.

TIRE-SIGNAL.

1,281,274.

Specification of Letters Patent.

Patented Oct. 15, 1918.

Application filed August 7, 1917. Serial No. 184,973.

*To all whom it may concern:*

Be it known that I, LOUIS H. BERRY, a citizen of the United States, and a resident of Minneapolis, in the county of Hennepin and State of Minnesota, have invented certain new and useful Improvements in Tire-Signals, of which the following is a specification.

One object of my invention is to provide in a tire signal attachable to the valve stem of a tire, means for giving an audible signal when the air pressure in the tire falls below a predetermined amount.

Another object of my invention is to provide in a tire signal an audible signal adapted to be sounded by a blow, and means for causing the blow to be struck when the tire pressure falls below a predetermined amount.

With these and incidental objects in view the invention consists of certain novel features of construction and combination of parts, the essential elements of which are hereinafter described with reference to the drawing which accompanies and forms a part of this specification.

In the drawing Figure 1 is a section taken on the line 1—1, Fig. 2; Fig. 2 is a side elevation of my improved tire signal; and Fig. 3 is a detail of the means used for clamping a cartridge in the signal.

A collar 1, Fig. 1, is adapted to engage by screw connection 2 with the valve stem of a common type of pneumatic tire, and carries by screw engagement, or other suitable means, a shell 3.

A pin 4, slidably mounted in the collar 1, carries on its inner end a perforated disk 5 on which the pressure spring 6, supported on its inner end by a washer 7 permanently fastened to the shell 3, will bear.

Apertures 8 allow the admission of air through the collar 1, and the apertures in the disk 5 permit passage of air through that disk, but a rubber seal 8′, clamped by nuts 9, seals the shell 3 so that air cannot pass beyond the rubber seal.

A disk plunger head 10 carries a latch 11, slidably mounted in a guide 12 suitably fastened to the shell 3 at 13.

A compression spring 14 serves to normally press the plunger head 10 against the rubber seal 8′.

Pivoted in the shell 3 at 15 is a bell crank which forms a striking hammer 16 at one end and a trigger 17 at its other end, the hammer 16 carrying at its extremity a firing pin 18.

A heavy spring 19, having a loop 20 over the trigger end of the bell crank, by pressure of its other end against the shell 3 provides striking force for the hammer 16, and the pin 21, carried by the bell crank, prevents the displacement of the spring.

The shell 3 is brought around in a curved portion 22 having a closure 23 in which is an aperture to receive a blank cartridge 24, the cartridge being slid into engagement with the sides of the aperture, and its head restrained from backward motion by the clip 25, Fig. 2, while it is held in alinement by a spring clip 26, Figs. 2 and 3.

Referring to Fig. 1, if the tire signal is placed on the valve stem of a tire which has been pumped up to normal pressure, as seventy-five pounds, the spring 6 will be of sufficient strength to force the pin 4 down against the valve stem of the tire valve and open it, thus allowing air pressure from the tire to enter the pocket in the lower end of shell 3 which is sealed by the seal 8′.

This air pressure will force the plunger 10 upwardly so that the trigger 17 can be latched on the latch 11, as shown in Fig. 1.

The blank cartridge 24 is then inserted and the car to which the tire is attached driven as usual.

When the tire pressure falls below a predetermined amount, say fifty-five pounds, the spring 14 will be of sufficient strength to overcome the air pressure, thereby releasing the trigger 17 from the latch 11, and the hammer will drive its firing pin 18 into the rim of the cartridge thereby exploding it and the driver of the car will know that the pressure in his tire is below a safe amount and will hence pump the tire up again as soon as convenient, thereby preventing the rim cutting of the tire.

While I have described my invention and illustrated it in one particular design, I do not wish it understood that I limit myself to this construction, as it is evident that the application of my invention may be varied in many ways within the scope of the following claims.

Claims:

1. In a tire signal the combination of a shell attachable to the valve stem of a tire and having apertures to allow air to enter the end of the shell attached to the stem of the tire, a spring controlled pin for opening the valve in the tire stem, a disk carried by said pin having apertures therein to allow the passage of air therethrough, a flexible air seal positioned in said shell above said spring controlled pin, a plunger spring controlled and normally pressed against said air seal positioned above said air seal in said shell, a latch carried by said plunger, a bell crank forming a trigger at one end engageable with said latch and a hammer at its other end, a spring to actuate said hammer when it is released from said latch, and means for carrying a cartridge in juxtaposition to said hammer so that it may be fired by said hammer when it is released from said latch.

2. In a tire signal the combination of a shell having means of engagement with the valve stem of a tire, spring controlled means to open the valve in said valve stem when the signal is placed thereon, a movable air seal closing a portion of the tube, a bell crank, one arm of which constitutes a hammer for exploding a cartridge, the other arm of which comprises a trigger, a latch for said trigger holding said hammer out of contact with said cartridge and spring means for unlatching said trigger when the pressure in the tire, to which the device is attached, falls below a predetermined amount.

LOUIS H. BERRY.